United States Patent [19]
Inatome

[11] Patent Number: 6,142,632
[45] Date of Patent: *Nov. 7, 2000

[54] FILM POSITION DETECTION APPARATUS AND METHOD AND IMAGE FILM PROJECTION APPARATUS

[75] Inventor: Kiyoshi Inatome, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/045,290

[22] Filed: Mar. 20, 1998

[30] Foreign Application Priority Data

Mar. 24, 1997 [JP] Japan ................................. 9-069804

[51] Int. Cl.$^7$ ..................................................... G03B 1/00
[52] U.S. Cl. ............................ 352/166; 352/92; 396/406; 324/688
[58] Field of Search ................................ 324/687, 688; 309/406; 352/166, 92

[56] References Cited

U.S. PATENT DOCUMENTS

| | | | |
|---|---|---|---|
| 4,713,603 | 12/1987 | Thorn | 324/61 |
| 4,743,837 | 5/1988 | Herzog | 324/60 |
| 5,608,474 | 3/1997 | Fujiwara et al. | 352/166 |
| 5,635,725 | 6/1997 | Cooper | 250/559.29 |
| 5,710,616 | 1/1998 | Saito et al. | 352/92 |
| 5,757,196 | 5/1998 | Wetzel | 324/688 |
| 5,767,686 | 6/1998 | Kespohl | 324/662 |
| 5,793,053 | 8/1998 | Cooper | 250/559.29 |

*Primary Examiner*—Howard B. Blankenship
*Assistant Examiner*—Timothy J Thompson
*Attorney, Agent, or Firm*—Frommer Lawrence & Haug, LLP.; William S. Frommer

[57] ABSTRACT

A film position detection apparatus and a method for precisely detecting a film position are provided. An image film projection apparatus is also provided for correcting deflections of images through precisely detecting a film position and thereby projecting images recorded on the film in a good condition. A film position detection means has a ground electrode attached to a movable picture gate; detection electrodes placed in a fixed picture gate; and auxiliary electrodes placed around the detection electrodes. The auxiliary electrodes suppress erroneous variations in electrostatic capacitance generated between the ground electrode and the detection electrodes. As a result, accuracy in film position detection by the detection electrodes is improved for achieving precise detection.

6 Claims, 13 Drawing Sheets

FILM POSITION DETECTION APPARATUS AND METHOD AND IMAGE FILM PROJECTION APPARATUS

BACKGROUND OF THE INVENTION

1. Field of the Invention

The present invention relates to a film position detection apparatus and a film position detection method for detecting shifts of a position of an object in the form of a film such as an image film and an image film projection apparatus for projecting light onto an image film and projecting images recorded thereon.

2. Description of the Related Art

A transport position and other factors of an image film such as a movie film 1 shown in FIG. 1 are detected in a film position detection apparatus for detecting a position and other factors of a film-shaped object continuously or intermittently running.

The movie film (which may be simply referred to as 'film' in the following description) 1 shown in FIG. 1 has sprocket holes (perforations) 2 for synchronization of film transport at both ends of the width of the film 1 at regular intervals in sequence. Recording areas 4 and 5 for recording image and audio information are provided in a portion between rows 3A and 3B of the sprocket holes 2.

The film position detection apparatus for detecting a position and other factors of the film 1 as described above is used for a movie film projection apparatus for projecting images recorded on a movie film, for example. The movie film projection apparatuses include an ordinary movie projector and an apparatus for electronization of information on a film (referred to as a telecine apparatus in the following description). FIG. 2 illustrates an example of a telecine apparatus 100 wherein a film position detection apparatus is used.

In the telecine apparatus 100 the film 1 is intermittently transported by a transport system 200 having a plurality of transport sprockets 210 and 220. If the film position detection apparatus detects the recording area 4 of the film 1 stopped at a specific position in a gate section 300, a shutter 420 in a projection section 400 opens so that light is projected from a light source 410. Consequently an image recorded on the film 1 is projected onto an image pickup section 600 including an image pickup device through a projection lens 500.

In the telecine apparatus 100 as described so far, variations are produced frame by frame in positions of the film 1 in the direction of transport and the direction of width when the film 1 is stopped after intermittent transport. The variations result in deflections of projected images and quality thereof is reduced. If a stopping position of the film 1 is precisely detected by the film position detection apparatus, an output produced thereby is used for compensating deflections of images by an optical or electronic means. However, film position detection apparatuses of related arts have problems described below and accuracy is not satisfactory for compensating deflections of images.

The types of film position detection apparatus of related arts will now be described together with problems thereof.

A method shown in FIG. 3 is for detecting a position of transport of the film 1 through detecting an angle of rotation of a sprocket 20a placed near a gate section 300 by an angle of rotation detector 11. However, the method has a problem of reduced position detection accuracy due to changes with time in the shape of the sprocket holes 2 producing play between each teeth of the sprocket 20a and each of the sprocket holes 2 and due to the sprocket 20a placed apart from the gate section 300. Another problem is that the method does not allow detection of a position in the direction of width of the film 1 but detection of a position of transport of the film 1.

An electrostatic capacitance method has been provided for detecting both of a position in the direction of transport and a position in the direction of width of the film 1. Specific examples of the electrostatic capacitance method will now be described with reference to FIG. 4 to FIG. 9. In FIG. 5A and FIG. 5B to FIG. 8A and FIG. 8B, each A and B illustrate cross sections taken along line A–A' and line B–B', respectively, of a detection region 12 in FIG. 4. The detection region 12 is a region corresponding to an edge of the film 1 including the sprocket holes 2. Electrodes for producing electrostatic capacitance (which may be referred to as 'capacitance' in the following description) are provided in the region. A position of the film 1 is detected through detecting changes in the capacitance.

A method shown in FIG. 5A and FIG. 5B provides a flat-shaped ground electrode 13 for producing electrostatic capacitance, opposed to detection electrodes 14 to which voltage is applied. The ground electrode 13 is pressed against the film 1 by the action of springs 15 so as to move in the direction of the film thickness. In this method the vertical position of the ground electrode 13 slightly changes when the film 1 advances and stops since the ground electrode 13 contacts the film 1. Therefore the capacitance changes due to variations in the space between the electrodes, which leads to a great error in film position detection.

Reference is now made to FIG. 6A and FIG. 6B illustrating a method wherein a flat-shaped ground electrode 13A is held with an established space from detection electrodes 14A. The space is allowed to be greater than the film thickness so that the film 1 passes smoothly. (For example, the space may be 0.2 mm when the film thickness is 0.16 mm.) A detection error arises in the method since the position of the film 1 is allowed to change in the direction of thickness in the space. The cause of the error is that the dimensions of the detection electrodes 14A are not great enough compared to those of the ground electrode 13A and the space and consequently a proportion of transversely expanding components of electric field E becomes greater between the electrodes as shown in FIG. 9.

A method shown in FIG. 7A and FIG. 7B provides a ground electrode 13B with convexes formed only in parts facing the detection electrodes 14B. The space between the ground electrode 13B and the detection electrodes 14B is narrow. The space is greater between the detection electrodes 14B and the part of the ground electrode 13B where the convexes are not formed so as not to affect generation of capacitance. In this method a proportion of transversely expanding components of electric field E as in the method shown in FIG. 6A and FIG. 6B is reduced. As a result, variations in capacitance due to shifts in the position of the film 1 in the space in the direction of film thickness are reduced. Detection accuracy is thus improved compared to that of the method shown in FIG. 6A and FIG. 6B. However, the accuracy is still not satisfactory. Another problem is that with the convex ground electrode 13B the position detection output changes with variations in the location of the electrode on the film surface (in the directions of film transport and width). Position detection is thus affected.

Still another problem is that it is difficult to achieve repeatability of the electrode position (of the order of microns) to prevent detection errors since the ground electrode 13B is moved off the detection electrodes 14B when the film is placed or removed.

Another method is shown in FIG. 8A and FIG. 8B, providing a frame-shaped film retainer 16 formed around a convex ground electrode 13C for pressing the film 1 against detection electrodes 14C. The film retainer 16 suppresses shifts in the position of the film 1 in the direction of the thickness in a fixed space. In this method accuracy is improved in the position of the film 1 in the direction of the thickness, compared to the method described above providing the convex ground electrode 13B only. However, detection accuracy of the method is still not satisfactory since the film 1 is not pressed directly on the detection electrodes 14C and shifts remain in the position of the film 1 in the direction of the thickness over the electrodes. Another problem is that the film 1 may receive flaws due to friction produced by the film retainer 16 pressing the film 1 with narrow areas. Still another problem is that noise is added to the detection output due to static electricity produced between the film 1 and the film retainer 16.

SUMMARY OF THE INVENTION

It is an object of the invention to provide a film position detecting apparatus and method for precisely detecting a film position. It is another object of the invention to provide an image film projection apparatus for correcting deflections of images through precisely detecting a film position and thereby projecting images recorded on the film in a good condition.

A film position detection apparatus of the invention comprises: a means for generating electrostatic capacitance in response to the position of the film-shaped object transported, located near a place where the film-shaped object is transported; a means for detecting the position of the film-shaped object based on a change in the electrostatic capacitance generated by the means for generating electrostatic capacitance; and a means for suppressing an erroneous variation in the electrostatic capacitance generated by the means for generating electrostatic capacitance, located near the means for generating electrostatic capacitance.

A film position detection apparatus of the invention comprises: a first electrode located near a place where a film-shaped object is transported; a second electrode opposed to the first electrode with the film-shaped object in between; a position detection circuit for detecting the position of the film-shaped object based on a change in voltage generated between the first and second electrodes in response to a change in electrostatic capacitance generated between the electrodes; and an auxiliary electrode located near the second electrode for suppressing an erroneous variation in the electrostatic capacitance generated between the first and second electrodes.

A film position detection method of the invention comprises a step of placing an auxiliary electrode near a second electrode and adjusting a voltage applied to the auxiliary electrode so that a value of the voltage allows an erroneous variation in electrostatic capacitance generated between a first electrode and the second electrode to be suppressed and thereby an error in detection of the position of a film-shaped object to be minimized.

An image film projection apparatus of the invention comprises: a first electrode located near a place where an image film is transported; a second electrode opposed to the first electrode with the image film in between; a position detection circuit for detecting the position of the image film based on a change in voltage generated between the first and second electrodes in response to a change in electrostatic capacitance generated between the electrodes; an auxiliary electrode located near the second electrode for suppressing an erroneous variation in the electrostatic capacitance generated between the first and second electrodes; and a means for correcting a shift in a projected image obtained through projecting light onto the image film in accordance with a result of detection by the position detection circuit.

In the film position detection apparatus of the invention the means for suppressing located near the means for generating electrostatic capacitance suppresses an erroneous variation in the capacitance. Sensitivity for detecting a shift in the position of the film-shaped object in the direction of thickness is thus reduced. As a result, the position of the film-shaped object in the direction of surface thereof is precisely detected without the effect of the shift in the position of the film-shaped object in the direction of thickness during transport.

In the film position detection apparatus of the invention the auxiliary electrode located near the second electrode suppresses an erroneous variation in the capacitance generated between the first and second electrodes. Sensitivity for detecting a shift in the position of the film-shaped object in the direction of thickness is thus reduced. As a result, the position of the film-shaped object in the direction of surface thereof is precisely detected without the effect of the shift in the position of the film-shaped object in the direction of thickness during transport.

In the film position detection method of the invention the voltage applied to the auxiliary electrode placed near the second electrode is adjusted so that the error in detection of the position of the film-shaped object is minimized. As a result, the position of the film-shaped object in the direction of surface thereof is precisely detected.

In the image film projection apparatus of the invention accuracy in detection of the position of the image film in the direction of surface thereof is improved through the function of the auxiliary electrode placed near the second electrode. As a result, a shift in the position of the image film in the direction of surface thereof, if any, is precisely detected. Based on the result of detection the shift in the projected image obtained through projecting light onto the film is corrected. Projection of the image is therefore performed in a good condition.

Other and further objects, features and advantages of the invention will appear more fully from the following description.

DETAILED DESCRIPTION OF THE PREFERRED EMBODIMENT

Preferred embodiments of the invention will now be described in detail with reference to the accompanying drawings. Examples will be described wherein a film position detection apparatus and a film position detection method are applied to a telecine apparatus in the following preferred embodiments.

[First Embodiment]

Figure 1:
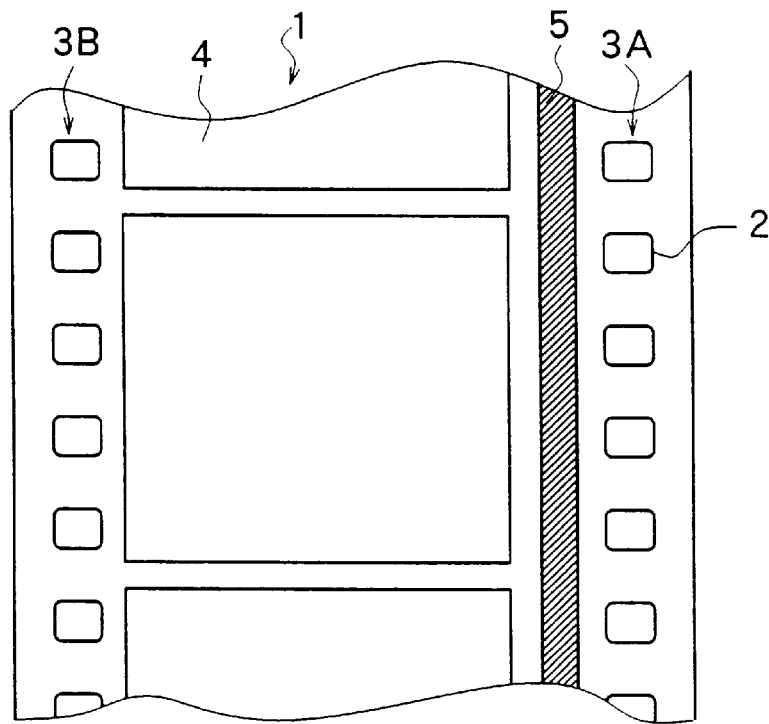
FIG. 1 is a plan view for illustrating the structure of a movie film as an example of a film-shaped object.
Figure 2:
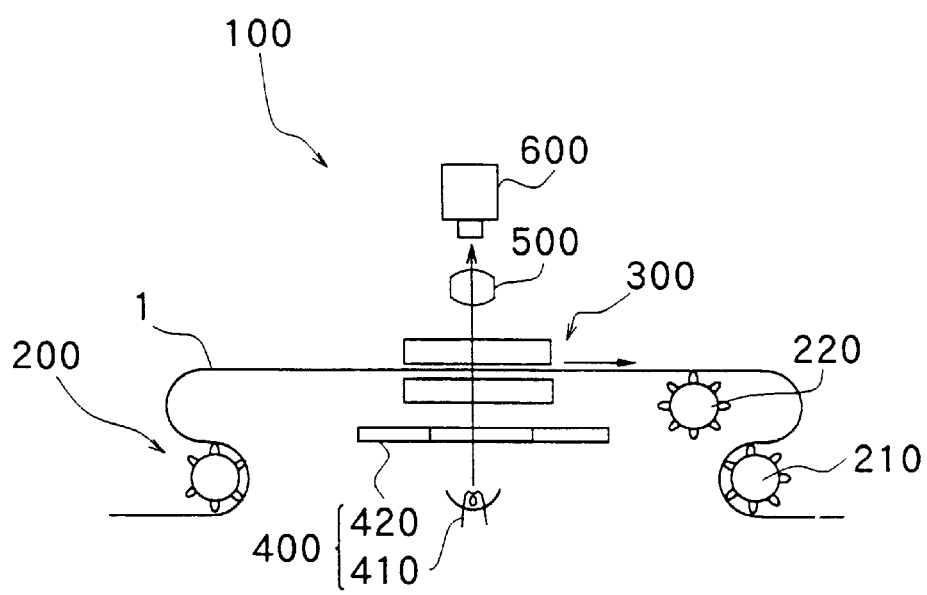
FIG. 2 illustrates an overall configuration of a telecine apparatus of a related art.
Figure 3:
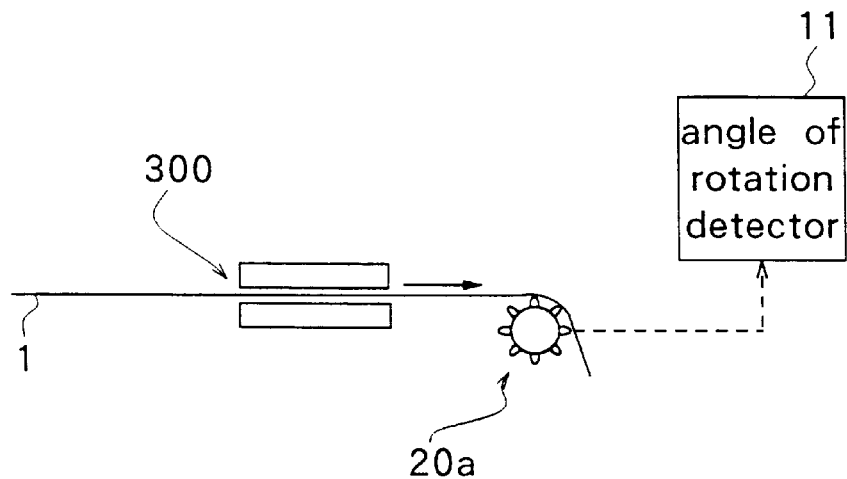
FIG. 3 illustrates an example of a film position detection method of a related art.
Figure 4:
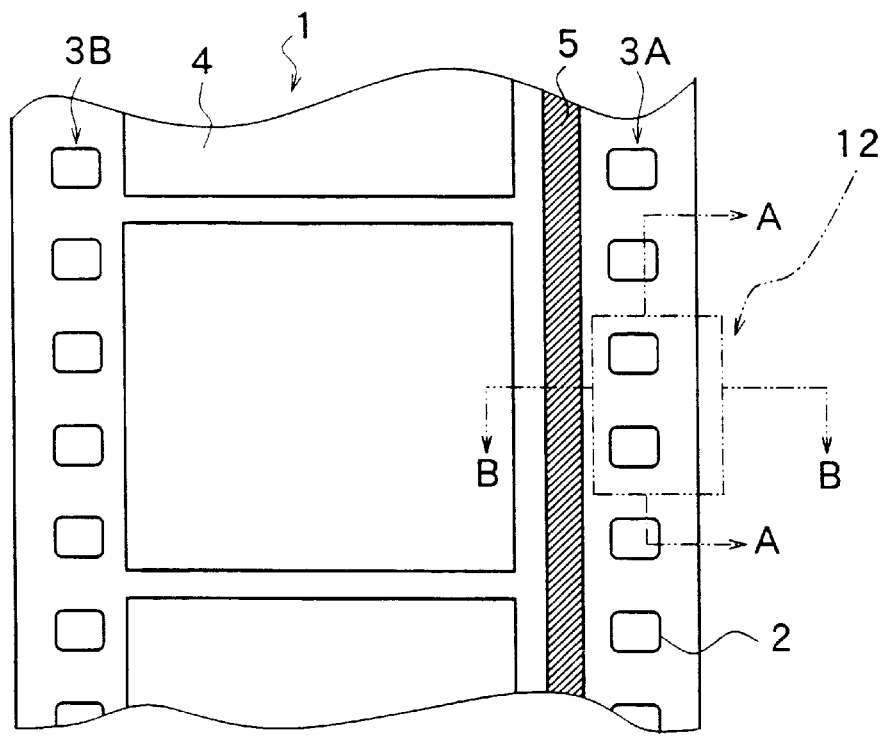
FIG. 4 illustrates a detection region of the film position detection method of the related art.
Figure 5A:
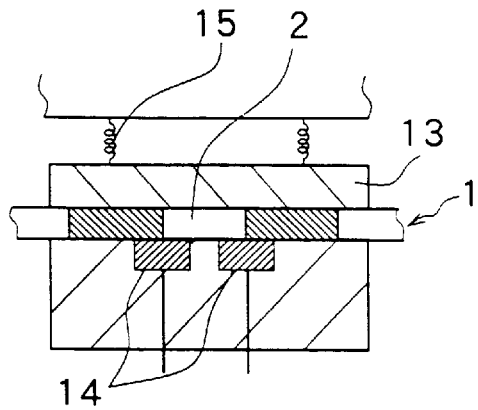
FIG. 5A and FIG. 5B illustrate an example of a film position detection method of a related art utilizing electrostatic capacitance.
Figure 5B:
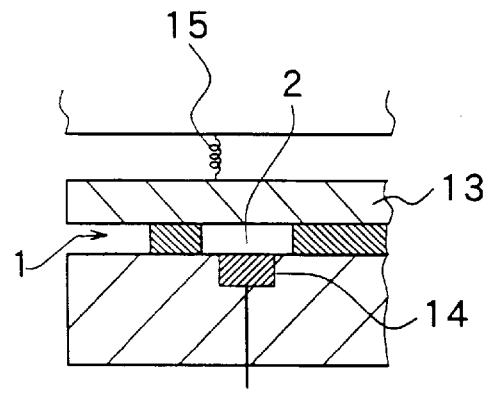
Figure 6A:
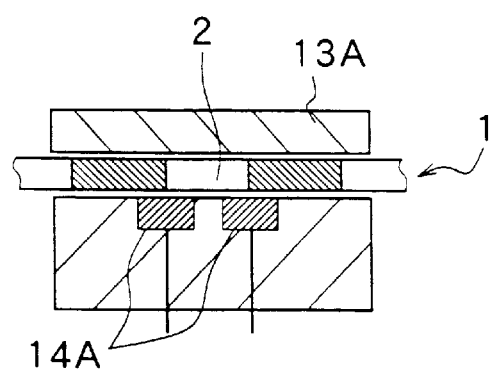
FIG. 6A and FIG. 6B illustrate another example of a film position detection method of a related art utilizing electrostatic capacitance.
Figure 6B:
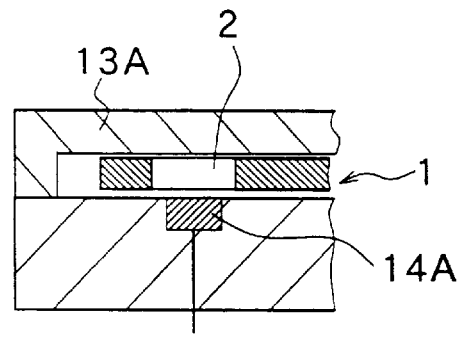
Figure 7A:
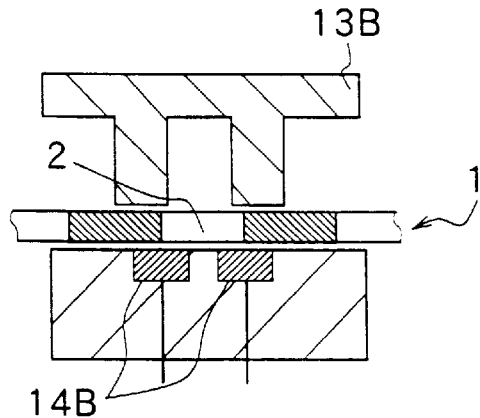
FIG. 7A and FIG. 7B illustrate still another example of a film position detection method of a related art utilizing electrostatic capacitance.
Figure 7B:
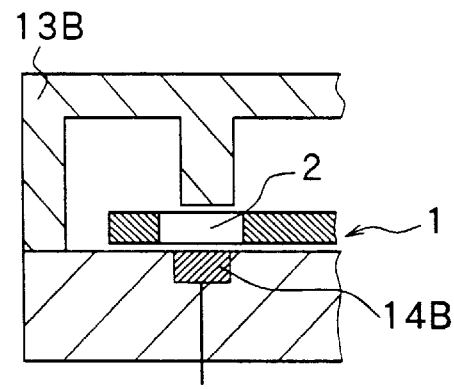
Figure 8A:
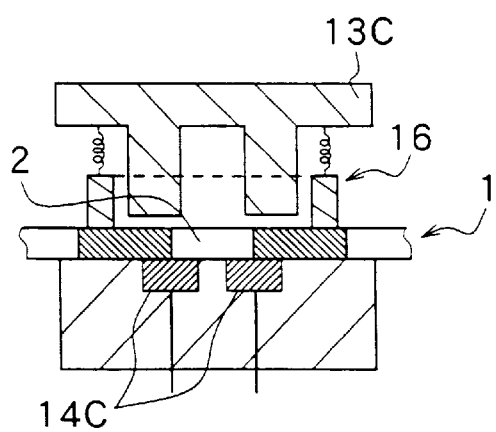
FIG. 8A and FIG. 8B illustrate still another example of a film position detection method of a related art utilizing electrostatic capacitance.
Figure 8B:
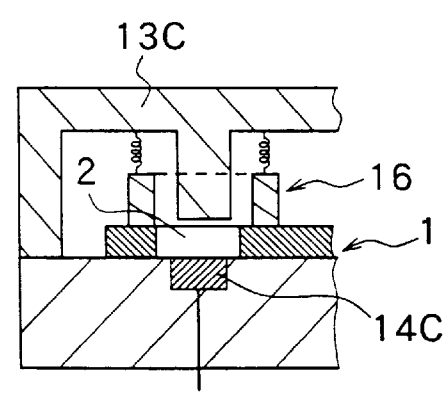
Figure 9:
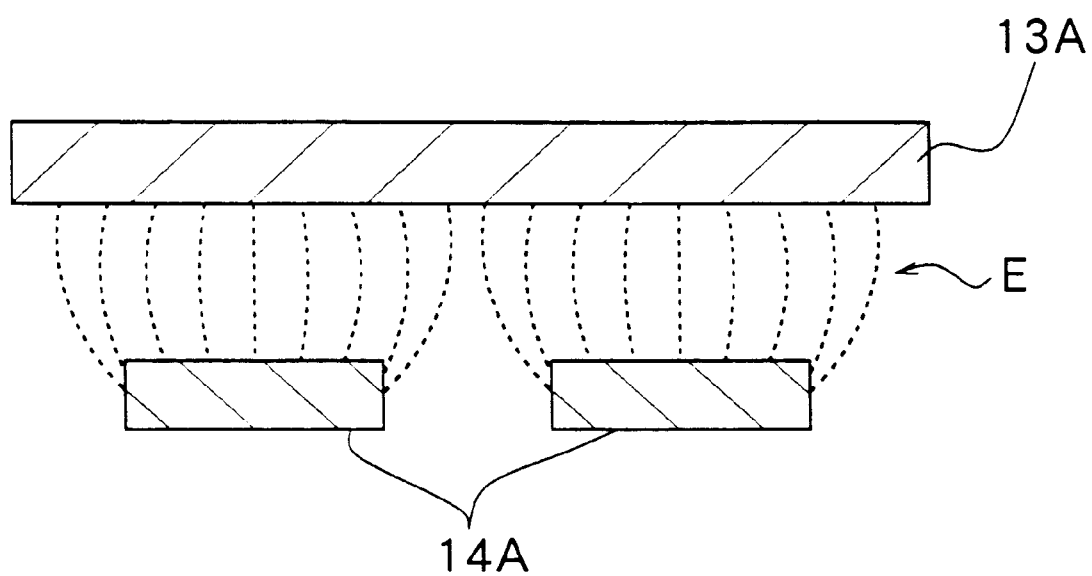
FIG. 9 illustrates transversely expanding electric field produced by the film position detection method of the related art.
Figure 10:
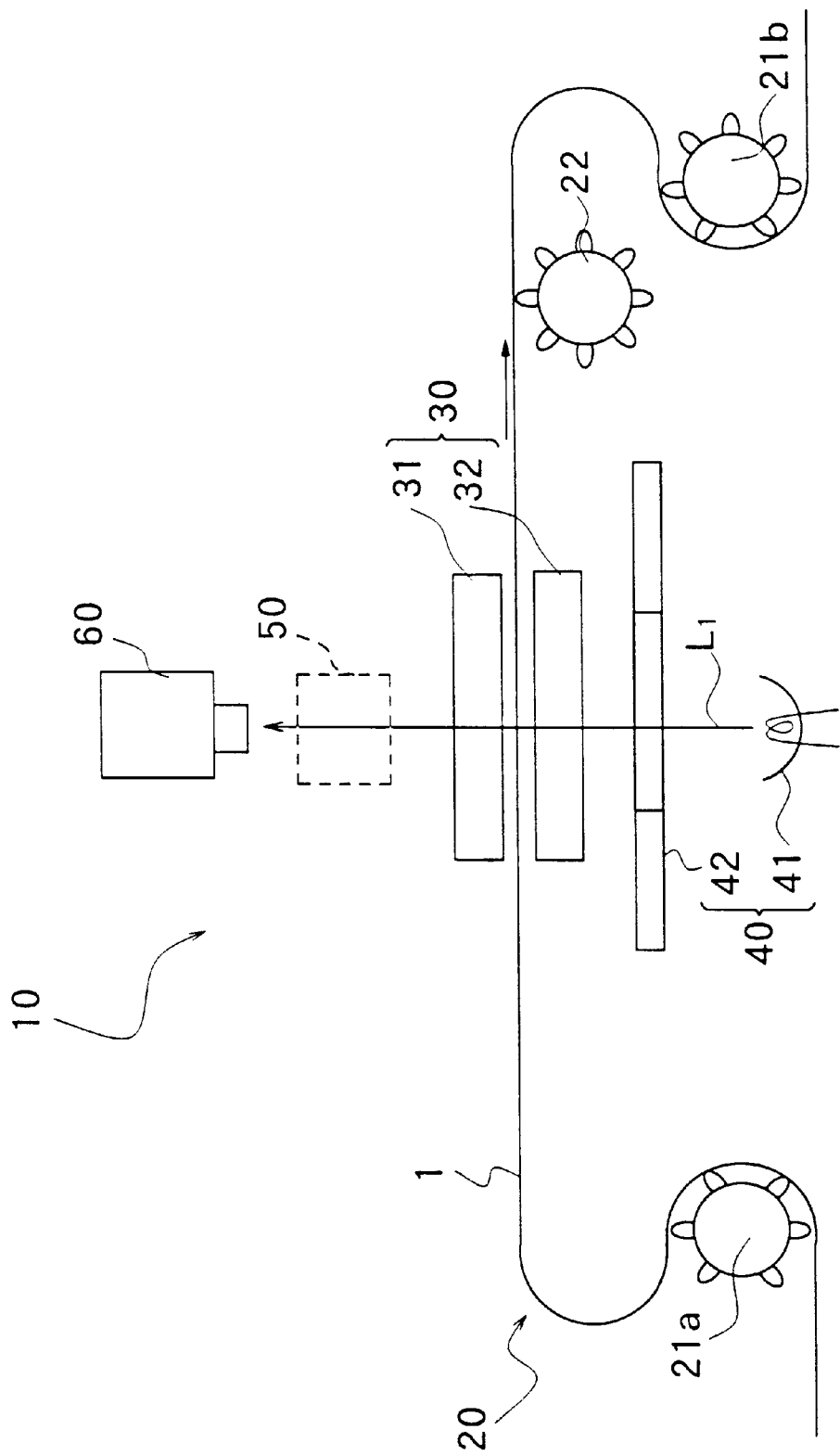
FIG. 10 illustrates an overall configuration of a telecine apparatus (an apparatus for electronization of information recorded on a film) of the invention.

FIG. 10 illustrates an overall configuration of a telecine apparatus 10 comprising a film position detection apparatus of a first embodiment of the invention. In the telecine apparatus 10 of the embodiment a film similar to the movie film 1 shown in FIG. 1 described in the section on related art is used.

The overall configuration and operation of the telecine apparatus 10 will now be described.

The telecine apparatus 10 comprises: a transport system 20 for transporting the film 1; a gate section 30 wherein a film position detection apparatus for detecting a position of the film 1 transported by the transport system 20 is located; a projector section 40 for projecting light onto the film 1 placed in a given position in the gate section 30; an optical axis correction and projection lens section 50 having an optical axis correction system for performing optical axis correction in accordance with the position of the film 1 detected by the film position detection apparatus placed in the gate section 30 and a projection lens for condensing projection light passing through the gate section 30; and an image pickup section 60 having an image pickup apparatus/device and so on for taking an image of the film 1 projected with light from the projector section 40 and electronizing the image recorded on the film 1.

In the telecine apparatus 10 described so far the film 1 is intermittently transported by the transport system 20. The film position detection apparatus to be described later detects the recording area 4 (FIG. 1) of the film 1 stopped in a given position in the gate section 30. In this case the projector section 40 projects light so that the image recorded on the film 1 is projected onto the image pickup section 60 through the optical axis correction and projection lens section 50.

The constituents of each section of the telecine apparatus 10 and operations thereof will now be described.

The transport system 20 of the telecine apparatus 10 has continuous sprockets 21a and 21b for continuously transporting the film 1 and an intermittent sprocket 22 for intermittently transporting the film 1. The film 1 is thus transported intermittently near the gate section 30.

The projector section 40 has a light source 41 for generating light to be projected onto the film 1 and a projection shutter 42 opened and closed by a driving means (not shown) such as a motor. In the projector section 40 with such a configuration, opening and closing of the projection shutter 42 is repeated in synchronization with the intermittent transport motion of the film 1 by the intermittent sprocket 22. As a result, the projection shutter 42 opens only when the film 1 is stopped and the light from the light source 41 is projected onto the film 1.

The gate section 30 has a movable picture gate 31 which vertically moves at installation of the film 1 and a fixed picture gate 32 fixed in a position opposed to the movable picture gate 31 to retain the film 1 in between. The gates of the gate section 30 each have windows (not shown) for passing the light from the projector section 40 onto a given area of the film 1.

The gate section 30 further has the film position detection apparatus (not shown in FIG. 10) for detecting the position of the film 1. The film position detection apparatus has electrodes for generating electrostatic capacitance with an application of a given voltage and a film position detection circuit for applying the given voltage to the electrodes and detecting the film position from a change in the capacitance formed between the electrodes.

The configuration and operation of the film position detection apparatus provided in the gate section 30 will now be described with reference to FIG. 11 to FIG. 14.

Figure 11:
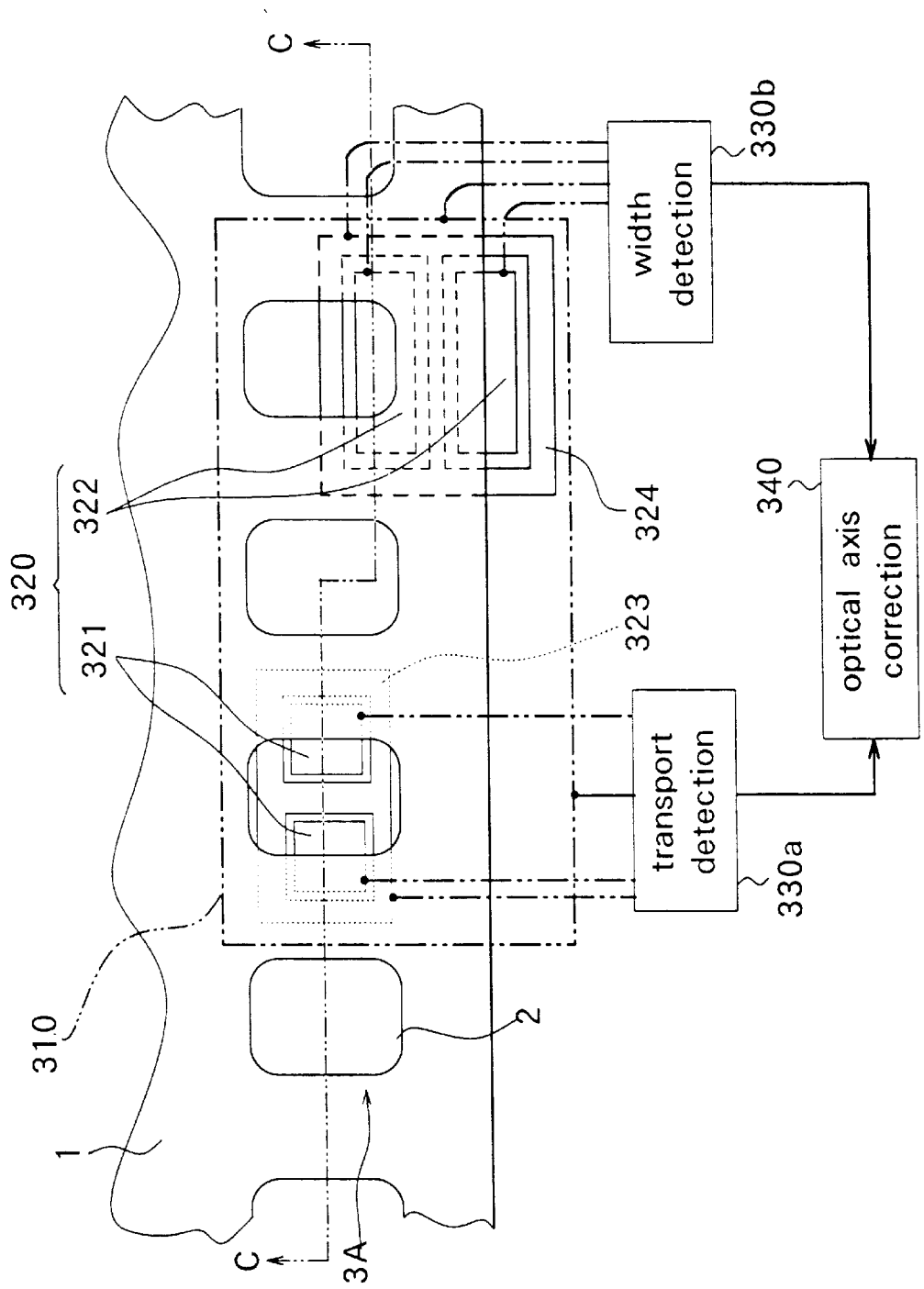
FIG. 11 is a plan view for mainly illustrating the structure of electrodes in a film position detecting apparatus of the invention.
Figure 12:
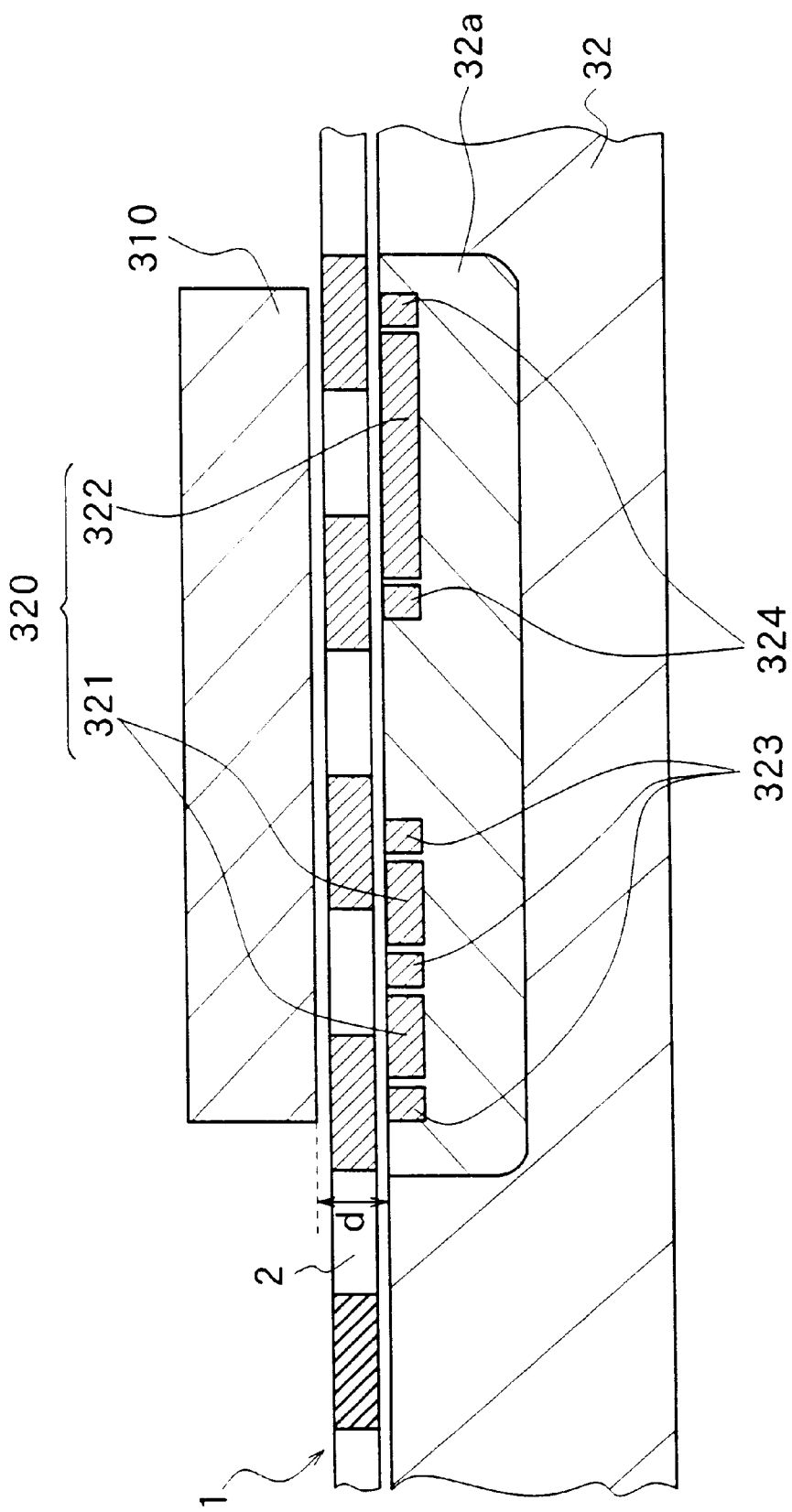
FIG. 12 is a cross section for illustrating the structure of the electrodes in the film position detecting apparatus of the invention.

FIG. 11 is a top view of the film position detection apparatus. FIG. 12 is a cross section taken along line C–C' in FIG. 11. As shown in the figures the electrodes for generating capacitance are placed in positions corresponding to the row 3A of the sprocket holes 2 and the area near the edge of the film 1. The electrodes are made up of: a ground electrode 310 as a first electrode attached to the movable picture gate 31; position detection electrodes 321 and 322 (referred to as detection electrodes 321 and 322 in the follow ing description) for detecting a position of the film 1 in the direction of transport and the direction of width, respectively, as second electrodes each buried in an insulator 32a (FIG. 12) in the fixed picture gate 32; and auxiliary electrodes 323 and 324 placed around the detection electrodes 321 and the detection electrodes 322 for suppressing erroneous variations in capacitance between the detection electrodes 321 and 322 and the ground electrode 310. A clearance 'd' greater than the thickness of the film 1 is provided between the ground electrode 310 and the remaining electrodes, that is, the detection electrodes 321, the detection electrodes 322 and the auxiliary electrodes 323 and 324. The clearance 'd' allows the film 1 to pass smoothly between the electrodes even if the film 1 has a partially increased thickness due to a joint and the like. The ground electrode 310, the detection electrodes 321 and the detection electrodes 322 correspond to electrostatic capacitance generating means of the invention. The auxiliary electrodes 323 and 324 correspond to error suppressing means of the invention.

The ground electrode 310 takes the form of a flat plate whose area is larger than those of the detection electrodes 321, the detection electrodes 322 and the auxiliary electrodes 323 and 324. The ground electrode 310 is placed in a position covering the plurality of sprocket holes 2.

The detection electrodes 321 are provided for detecting a shift in the position of the film 1 in the direction of film transport. The detection electrodes 322 are provided for detecting a shift in the position of the film 1 in the direction of film width. The detection electrodes 321 and the detection electrodes 322 are each made up of two individual electrodes so as to improve stability and sensitivity and so on of position shift detection. The two electrodes of the detection electrodes 321 are placed along the transport direction of the film 1 in a position corresponding to the row 3A of the sprocket holes 2. The two electrodes of the detection electrodes 322 are placed along the direction perpendicular to the transport direction of the film 1. One of the two electrodes is placed to the row 3A of the sprocket holes 2 while the other is placed to reach the film edge. The film position in the direction of transport is detected from the difference between the capacitance generated between one of the two electrodes of the detection electrodes 321 and the ground electrode 310 and that generated between the other electrode and the ground electrode 310. The film position in the direction of width is detected from the difference between the capacitance generated between one of the two electrodes of the detection electrodes 322 and the ground electrode 310 and that generated between the other electrode and the ground electrode 310.

The regions around the rows 3A and 3B of the sprocket holes 2 and the regions between the sprocket holes 2 of the film 1 are made of insulator such as triacetate (TAC, for example) and polyester including polyethylene terephthalate (PET). Generally electrostatic capacitance generated by a parallel-plate capacitor is proportional to the areas of both plates facing each other and the dielectric constant of an insulator placed between the plates. Since the dielectric constant of the insulator is relatively greater to air, the capacitance is greater with the insulator placed between the plates compared to air in between.

It is therefore noted that the capacitance between the transport direction detection electrodes 321 and the ground electrode 310 depends on the relation between the position of the sprocket holes 2 of the film 1 and the position of the detection electrodes 321 when the film 1 is intermittently transported. The capacitance between the detection electrodes 322 and the ground electrode 310 depends on the relation between the position of the film edge and the position of the detection electrodes 322 when the film 1 is intermittently transported. Each capacitance therefore indicates a different value depending on the relation. To be specific, the capacitance indicates a minimum value when the sprocket holes 2 are located directly above one of the two electrodes of the transport direction detection electrodes 321, that is, when the space between the ground electrode 310 and each of the two electrodes 321 is filled with air. In contrast, the capacitance indicates a maximum value when the sprocket holes 2 are not located directly above one of the two electrodes of the detection electrodes 321, that is, when the space between the ground electrode 310 and each of the two electrodes 321 is filled with the insulator. This applies to the detection electrodes 322 as well. The more the proportion of the insulator occupying the space between the ground electrode 310 and the opposed electrodes, the greater the capacitance becomes.

Position detection circuits 330a and 330b are each provided for detecting a position in the direction of film transport and film width. These circuits correspond to position detection means of the invention, each for detecting the variation in the capacitance as the variation of the voltage amplitude difference between one electrode pair and the other.

Figure 13:
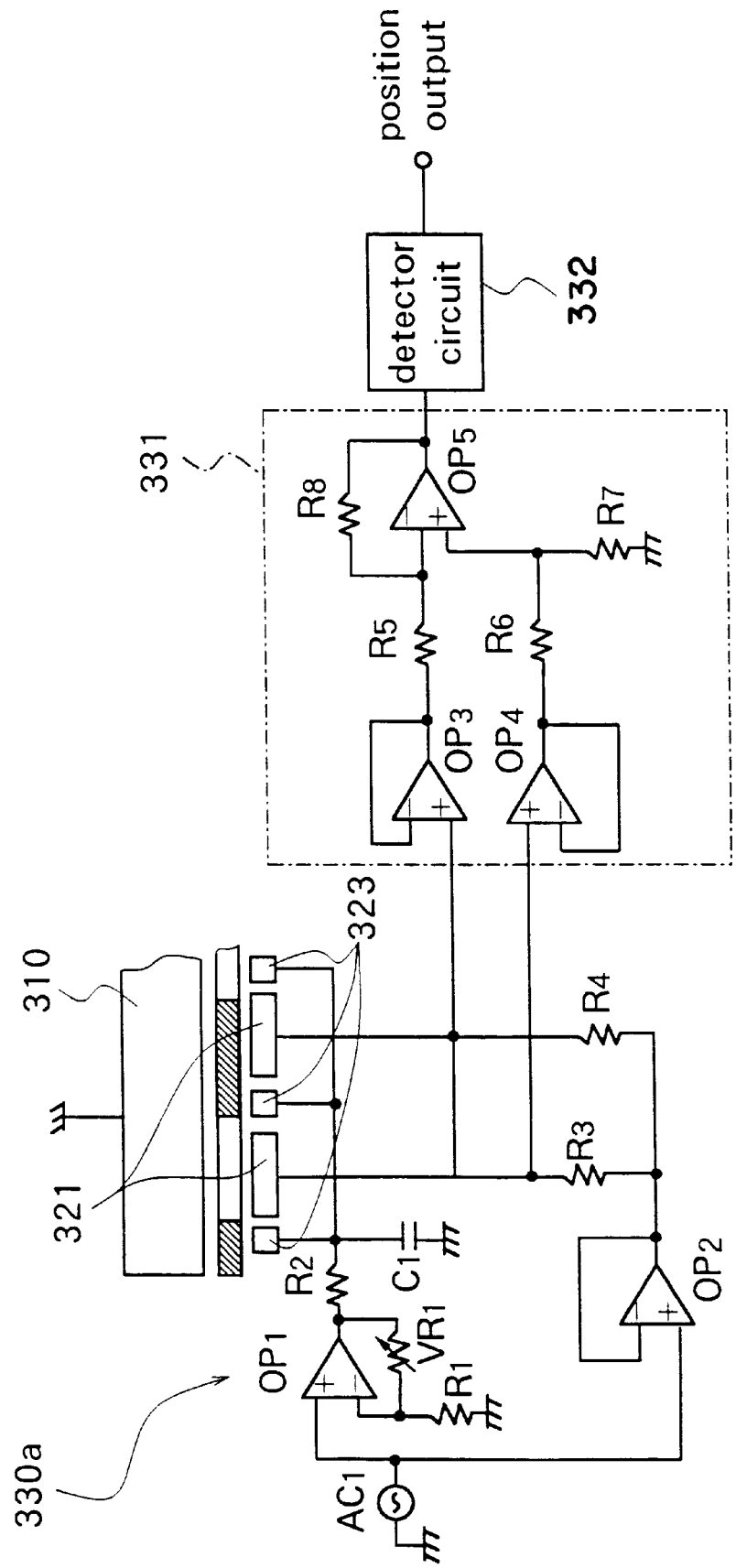
FIG. 13 is a block diagram of the film position detecting apparatus of the invention.

FIG. 13 is a block diagram of the film position detection circuit. Although the detection circuit 330a and the detection electrodes 321 are only shown, the detection electrodes 322 have a similar configuration and operation. Therefore the configuration and operation of the detection electrodes 321 will be mainly described while the detection electrodes 322 will not be shown and the description of the operation thereof will be basically omitted.

The detection circuit 330a has an alternating current source AC1 for generating AC voltage. Positive terminals of amplifiers OP1 and OP2 are electrically connected to the alternating current source AC1. One end of a resistor R1 whose other end is grounded and one end of a variable resistor VR1 are connected to the negative terminal of the amplifier OP1. The other end of the variable resistor VR1 and one end of a resistor R2 are connected to the output terminal of the amplifier OP1. The other end of the resistor R2 is connected to one end of a capacitor C1 whose other end is grounded and to the auxiliary electrode 323. On the other hand, the negative terminal of the amplifier OP2 and one ends of resistors R3 and R4 are connected to the output terminal of the amplifier OP2. The other ends of the resistors R3 and R4 are each connected to the two electrodes of the transport direction detection electrodes 321, respectively. A differential circuit 331 is electrically connected to the transport direction detection electrodes 321. The differential circuit 331 has amplifiers OP3, OP4 and OP5 and resistors R5, R6, R7 and R8. The positive terminal of the amplifier OP3 is connected to one of the two electrodes of the transport direction detection electrodes 321 while the negative terminal thereof is connected to its own output terminal. The positive terminal of the amplifier OP4 is connected to the other of the two electrodes of the transport direction detection electrodes 321 while the negative terminal thereof is connected to its own output terminal. The output terminal of the amplifier OP3 is connected to the negative terminal of the amplifier OP5 through the resistor R5. The output terminal of the amplifier OP4 is connected to the positive terminal of the amplifier OP5 through the resistor R6. The negative terminal of the amplifier OP5 is connected to its own output terminal through the resistor R8. The positive terminal of the amplifier OP5 is grounded through the resistor R7. A voltage as the output of the differential circuit 331 is produced at the output terminal of the amplifier OP5 to be inputted to a detector circuit 332.

The operation of the film position detection apparatus with a configuration as described so far will now be described.

In the detection circuit 330a, the same AC voltage is applied to each of the two electrodes of the detection electrodes 321 from the alternating current source AC1 through the amplifier OP2 and the resistors R3 and R4. As a result, capacitance is generated between each of the two electrodes and the ground electrode 310 in response to the transport position of the film 1.

In the detection circuit 330a, the variation in the capacitance generated in response to the transport position of the film 1 is detected as the difference in voltage amplitudes of the two electrodes. The difference is detected at the differential circuit 331 made up of the amplifiers OP3 to OP5 and the resistors R5 to R8. Homodyne detection is performed on the output signal from the differential circuit 331 at the detector circuit 332 to be outputted as the signal indicating the position of the film 1 in the direction of transport.

An AC voltage amplified at the amplifier OP1 is applied to the auxiliary electrode 323 placed around the detection electrodes 321. Phase adjustment is performed on the AC voltage by the RC circuit made up of the resistor R2 and the capacitor C1 so that the phase is equal to that of the AC voltage applied to the detection electrodes 321. The amplitude of the AC voltage applied to the auxiliary electrode 323 is adjustable by the variable resistor VR1 connected to the amplifier OP1.

As described so far, the AC voltage is applied to the auxiliary electrode 323 as the transport direction detection electrode 321 and the phase and the amplitude are adjusted. As a result, the effect of the transversely expanding components of electric field between the detection electrodes 321 and the ground electrode 310 will be reduced to some extent.

However although the same AC voltage is applied to the auxiliary electrode 323 and the detection electrodes 321, there is space between the auxiliary electrode 323 and the electrodes of the transport direction detection electrodes 321. Furthermore the dimensions of the auxiliary electrode 323 are finite. Because of these and other reasons it is not always possible to reduce the effect of the transversely expanding components of electric field between the detection electrodes 321 and the ground electrode 310 to the ideal level.

Figure 14:
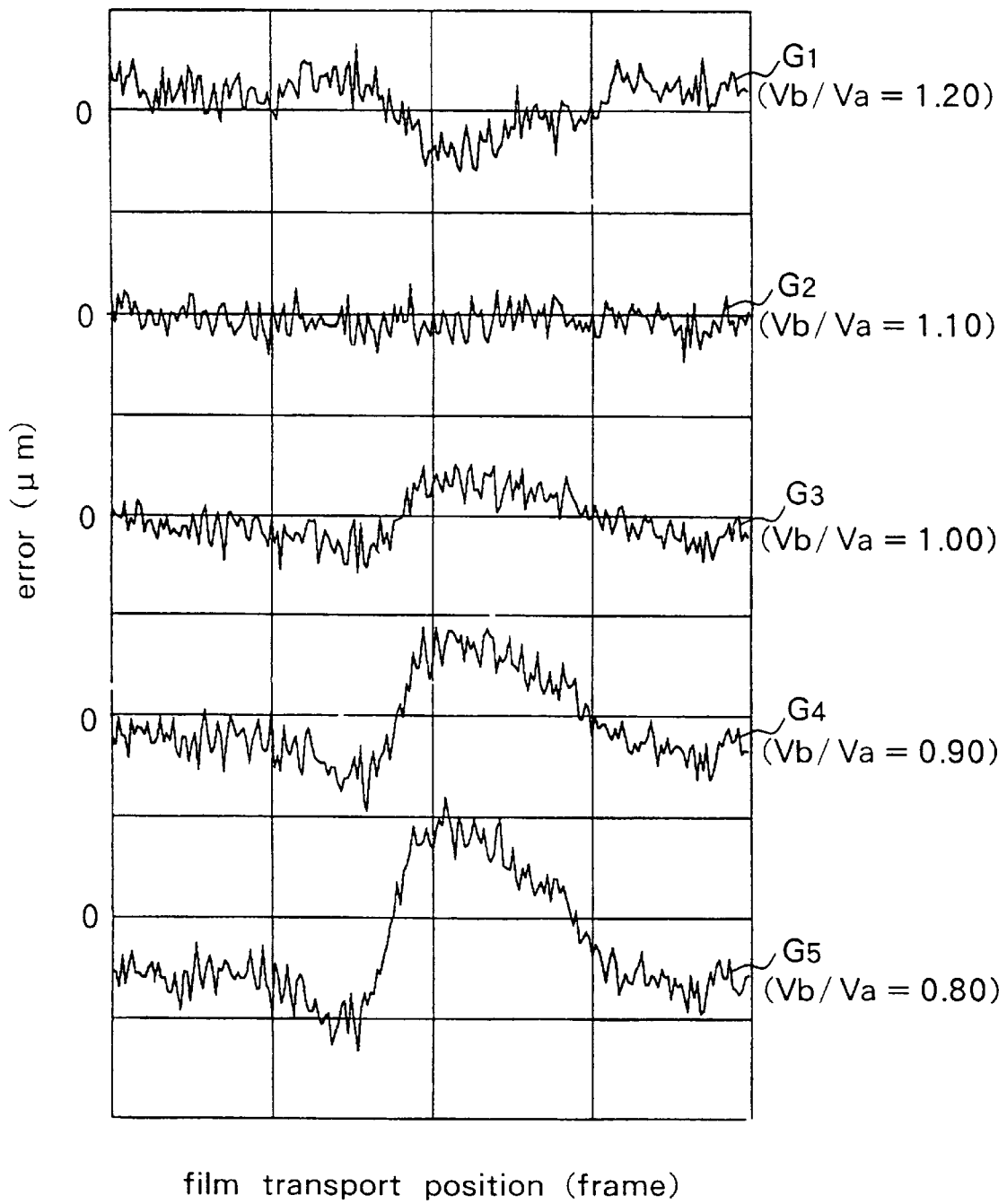
FIG. 14 is an example of data showing a relationship between the position of film transport and the error of position detection by a position detection circuit for film transport direction.

It is therefore preferable that the AC voltage applied to the auxiliary electrode 323 is of a different value from the AC voltage applied to the electrodes of the detection electrodes 321. FIG. 14 is an example of data showing a relationship between the position of transport of the film 1 frame by frame and the error of position detection by the detection circuit 330a in microns. FIG. 14 indicates graphs where the voltage applied to the electrodes of the detection electrodes 321 is 'Va' and the voltage applied to the auxiliary electrode 323 is 'Vb' and the voltage ratio Vb/Va is changed with Vb as a variable. Graphs G1, G2, G3, G4 and G5 are data taken when the voltage ratio Vb/Va is 1.20, 1.10, 1.00, 0.90 and 0.80, respectively. The detection errors obtained in the data are based on data taken with another higher precision position detection means such as one using an optical sensor.

As shown in the data the detection errors vary with the ratio of the AC voltage applied to the auxiliary electrode 323. It is also known from the data that the variations of the detection errors are reversed at a particular AC voltage when the ratio of the AC voltage applied to the auxiliary electrode 323 is changed. The AC voltage allowing the detection error variations to be reversed is the voltage for minimizing the detection errors. In the example shown in FIG. 14, the detection errors are minimum in graph G2 wherein the voltage increased by 10% of the AC voltage applied to the electrodes of the detection electrodes 321 is applied to the auxiliary electrode 323.

One of the reasons for the particular voltage applied to the auxiliary electrode 323 allowing the detection errors to be minimum will now be described. There is lateral capacitance between the auxiliary electrode 323 and each of the electrodes of the detection electrodes 321. The capacitance value greatly varies with shifts in the position of the film 1 in the direction of thickness. If the amplitude of the voltage applied to the auxiliary electrode 323 is changed, the degree of effect of the lateral capacitance on the capacitance between each of the electrodes of the transport direction detection electrodes 321 and the ground electrode 310 will be changed. Furthermore, the direction of the effect will be changed as well with an increase and decrease in the amplitude of the voltage applied to the auxiliary electrode 323. Consequently, there is a voltage which allows cancellation between the detection error of the position in the direction of transport resulting from the shift of position of the film 1 in the direction of thickness between the ground electrode 310 and the transport direction detection electrodes 321 and the effect of the change in film position in the direction of thickness which the transport direction detection electrodes 321 receives from the auxiliary electrode 323. The voltage therefore eliminates the effect of the shift in the position of the film 1 in the direction of thickness on the transport direction (and the width direction) of the film 1.

As described so far, the function of the auxiliary electrodes 323 and 324 reduces erroneous variations in the capacitance generated between the ground electrode 310 and the detection electrodes 321 (and the detection electrodes 322). The film position is detected by means of the detection circuits 330a and 330b so that the detection error is minimum. The result of detection is outputted to the optical axis correction circuit 340 (FIG. 11). At the optical axis correction circuit 340 the amount of shift of the position of the film 1 is determined from the detected film position and the amount of correction is calculated for correcting the amount of the shift. Optical axis correction of the required amount is performed based on the amount of correction at the optical axis correction and projection lens section 50 shown in FIG. 10.

The optical axis correction and projection lens section 50 will now be described with reference to FIG. 15.

Figure 15:
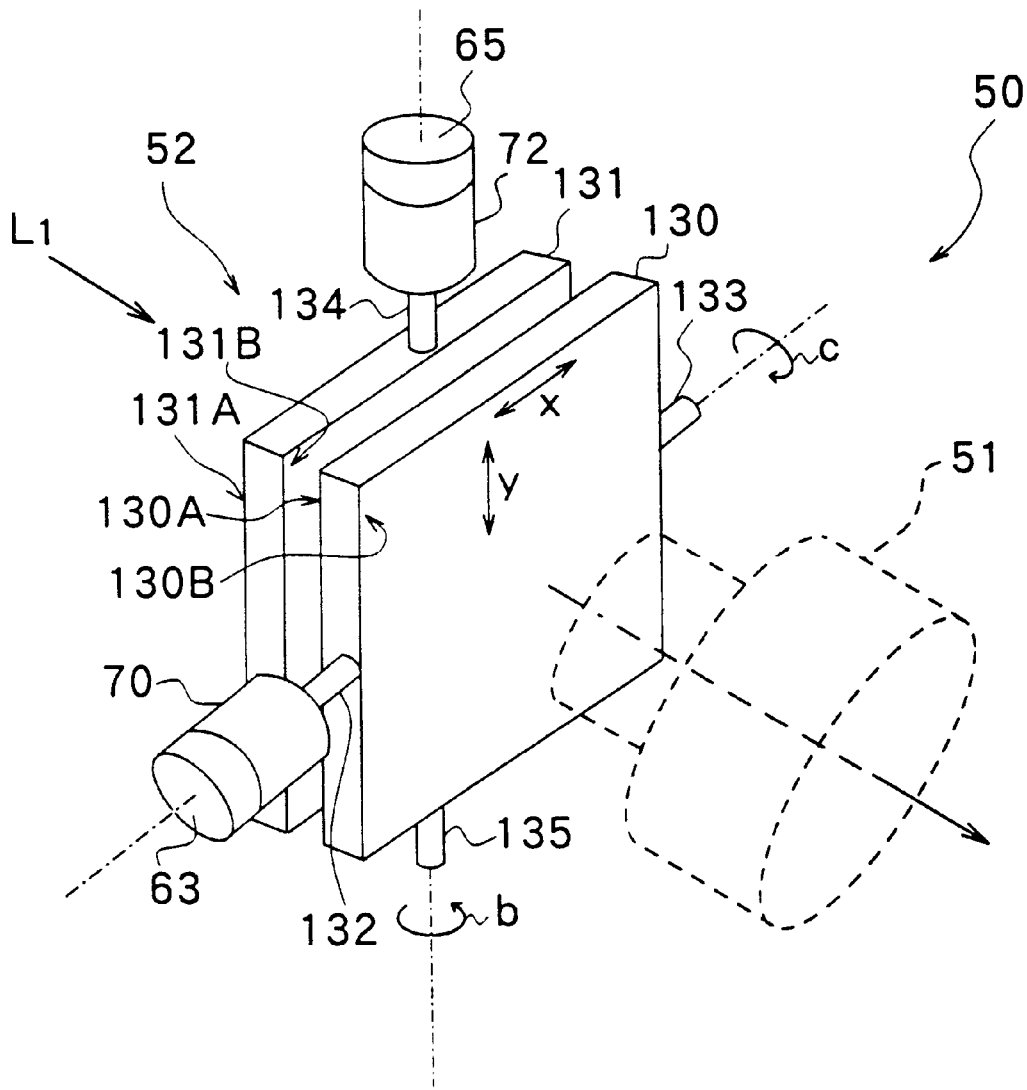
FIG. 15 is a perspective view for illustrating an example of configuration of an optical axis correction system.

As shown in FIG. 15, the optical axis correction and projection lens section 50 has an optical axis correction system 52 for performing optical axis correction of light projected through the gate section 30 and a projection lens 51 for condensing the projected light with the corrected optical axis.

The optical axis correction system 52 has a configuration such that the optical axis of the light projected from a light source 41 will be corrected with the amount of correction determined from the amount of shift of the film 1 at the optical axis correction circuit 340. The optical axis correction system 52 has a first flat plate 130 and a second flat plate 131. The flat plates 130 and 131 are both made of glass with the same refractive index.

Axial rods 132 and 133 sharing the output axis of a motor 70 as a coaxis are integrally attached to the sides of the first flat plate 130. The first flat plate 130 is rotatable in the direction shown with arrow 'c' and the reverse with the axial rods 132 and 133 as a rotational axis. The axial rod 132 is coupled to the output axis of the motor 70.

Axial rods 134 and 135 sharing the output axis of a motor 72 as a coaxis are integrally attached to the sides of the second flat plate 131. The second flat plate 131 is rotatable in the direction shown with arrow 'b' and the reverse with the axial rods 134 and 135 as a rotational axis. The axial rod 134 is coupled to the output axis of the motor 72.

The output axes of the motors 70 and 72 are placed perpendicular to each other. The motor 70 has an angle sensor 63 for detecting the amount of rotation of the first flat plate 130 based on the angle of rotation of the axial rod 132 and detecting the amount of correction of projection beam L1 in the direction of Y in the figure. The motor 72 has an angle sensor 65 for detecting the amount of rotation of the second flat plate 131 based on the angle of rotation of the axial rod 134 and detecting the amount of correction of projection beam L1 in the direction of X in the figure.

Figure 16:
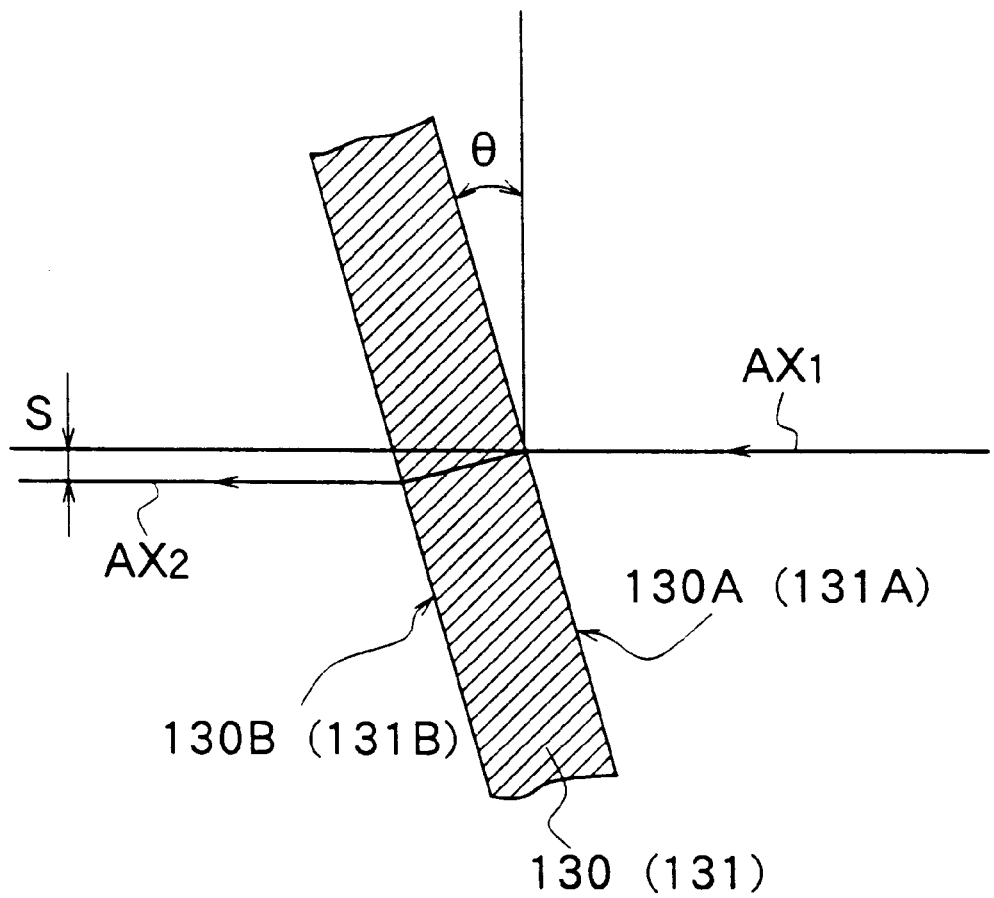
FIG. 16 is a cross section for illustrating the operation of the optical axis correction system.

FIG. 16 illustrates a cross section of the first flat plate 130 in the optical axis correction system 52 in FIG. 15. The cross section is taken in a plane including the optical axis of the projection beam L1 and the output axis of the motor 72. When the first flat plate 130 is perpendicular to the projection beam L1, incident optical axis AX1 and outgoing optical axis AX2 correspond to each other. Next, if the first flat plate 130 is rotated in the direction shown with arrow 'c' or in the reverse direction to be tilted 0 degrees, the outgoing optical axis AX2 is shifted parallel to the incident optical axis AX 1 by the range of 's'.

The description on FIG. 16 also applies to a cross section of the second flat plate 131 in the optical axis correction system 52 in FIG. 15 taken in a plane including the optical axis of the projection beam L1 and the output axis of the motor 70.

As described above, optical axis correction is performed on the light projected from the light source 41 in the two directions of X and Y by means of the optical axis correction system 52. As a result, parallel shift correction in a desired direction is achieved. Therefore, if the position of the film 1 is shifted in the gate section 30, correction is performed on the shift in the image projected to reach the image pickup section 60. Electronization of image information recorded on the film 1 is thus performed in a good condition.

In the embodiment of the invention as described so far, sensitivity of each of the detection electrodes 321 and the detection electrodes 322 is reduced by means of the auxiliary electrodes 323 and 324 placed around each of the detection electrodes 321 and 322. As a result, accuracy in position detection is improved along the film surface (in the directions of film transport and width).

Detection errors will be minimized only through adjusting a voltage applied to the auxiliary electrodes 323 and 324 if changes are made in the dimensions of the detection electrodes 321 and 322 and the auxiliary electrodes 323 and 324 and clearance 'd' between the ground electrode 310 and those electrodes.

Furthermore, the ground electrode 310 of fixed flat shape is simply structured and manufactured at low costs. Since space 'd' is provided between the film 1 and the electrodes, friction applied to the film 1 is reduced in the gate section 30 and transport load on the film 1 is reduced. Stable position detection is achieved without scratching the film 1 and gathering dust.

[Second Embodiment]

A second embodiment of the invention will now be described.

Figure 17:
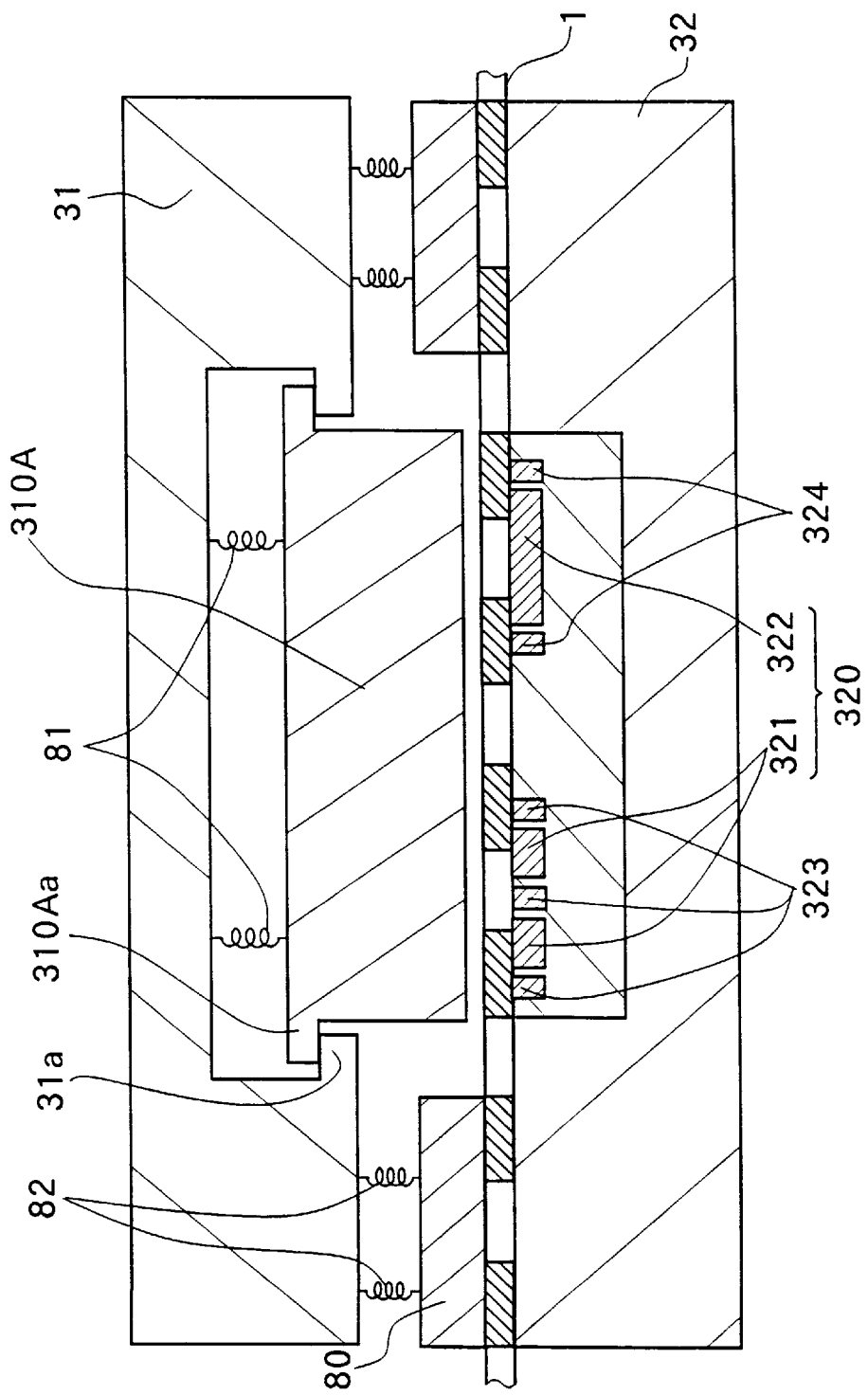
FIG. 17 is a cross section for illustrating the structure of a film position detecting apparatus of a second embodiment of the invention.

FIG. 17 is a cross section for illustrating the structure of a film position detection apparatus of a second embodiment of the invention.

Although the ground electrode 310 is fixed to the movable picture gate 31 in the first embodiment described above, a ground electrode 310A is coupled to a movable picture gate 31 with springs 81 in the second embodiment. The springs 81 support the ground electrode 310A so that a flange 310A$a$ of the ground electrode 310A is brought to contact with a support section 31$a$ of the picture gate 31. As a result, although the space between the electrodes is normally held constant, the ground electrode 310A vertically moves in accordance with the thickness of the film 1 if any part of the film 1 such as a joint has a different thickness. Consequently the film transport is smoothly performed.

In the film position detection apparatus of the embodiment pressers 80 coupled to the movable picture gate 31 with springs 82 are provided on both sides of the ground electrode 310A. The pressers 80 press the film 1 onto the fixed picture gate 32 so that shifts of the film 1 in the direction of thickness are suppressed.

The remainder of the operations and effects of the second embodiment are similar to those of the first embodiment and description thereof is omitted.

The present invention is not limited to the embodiments described so far but may be practiced in still other ways.

In the foregoing embodiments, for example, the auxiliary electrodes 323 and 324 are each placed to completely surround the detection electrodes 321 and 322, respectively. Alternatively, the auxiliary electrodes 323 and 324 may each partially surround the detection electrodes 321 and 322, respectively.

Although the foregoing embodiments illustrate the film position detection apparatus of the invention applied to the telecine apparatus, the invention is applicable to a film transport system of any other apparatus such as a movie projector.

Furthermore, the invention is applicable to detection of the position of any film-shaped object, other than the movie film 1 using electrostatic capacitance.

In the foregoing embodiments the optical axis correction system 52 is used as a means for optically correcting shift in the projected image. Alternatively, correction of shift in the projected image may be electronically performed on the image signals obtained from the image pickup device in the image pickup section 60 in accordance with the amount of shift in the film position obtained from the detection circuits 330$a$ and 330$b$.

In the film position detection apparatus of the invention as described so far, the means for suppressing located near the means for generating electrostatic capacitance suppresses an erroneous variation in the capacitance. Sensitivity for detecting a shift in the position of the film-shaped object in the direction of thickness is thus reduced. As a result, the position of the film-shaped object in the direction of surface thereof is precisely detected without the effect of the shift in the position of the film-shaped object in the direction of thickness during transport.

In the film position detection apparatus of the invention the auxiliary electrode located near the second electrode suppresses an erroneous variation in the capacitance generated between the first and second electrodes. Sensitivity for detecting a shift in the position of the film-shaped object in the direction of thickness is thus reduced. As a result, the position of the film-shaped object in the direction of surface thereof is precisely detected without the effect of the shift in the position of the film-shaped object in the direction of thickness during transport.

In the film position detection method of the invention the voltage applied to the auxiliary electrode placed near the second electrode is adjusted so that the error in detection of the position of the film-shaped object is minimized. As a result, the position of the film-shaped object in the direction of surface thereof is precisely detected.

In the image film projection apparatus of the invention accuracy in detection of the position of the image film in the direction of surface thereof is improved through the function of the auxiliary electrode placed near the second electrode. As a result, a shift in the position of the image film in the direction of surface thereof, if any, is precisely detected. Based on the result of detection the shift in the projected image obtained through projecting light onto the film is corrected. Projection of the image is therefore performed in a good condition.

Obviously many modifications and variations of the present invention are possible in the light of the above teachings. It is therefore to be understood that within the scope of the appended claims the invention may be practiced otherwise than as specifically described.

What is claimed is:

1. A film position detection apparatus for detecting a position of a film-shaped object transported comprising:

means for generating electrostatic capacitance in response to the position of said film-shaped object transported, located near a place where said film-shaped object is transported;

means for detecting the position of said film-shaped object based on a change in the electrostatic capacitance generated by said means for generating electrostatic capacitance; and means for suppressing an erroneous variation in the electrostatic capacitance generated by said means for generating electrostatic capacitance, located near said means for generating electrostatic capacitance, and being maintained at an electric potential different from that of said means for generating electrostatic capacitance, the ratio of the electric potentials of said means for suppressing an erroneous variation in the electrostatic capacitance and said means for generating electrostatic capacitance being selected so as to best suppress an erroneous variation in the electrostatic capacitance generated by said means for generating electrostatic capacitance.

2. A film position detection apparatus for detecting a position of a film-shaped object transported comprising:

a first electrode located near a place where said film-shaped object is transported;

a second electrode opposed to said first electrode with said film-shaped object in between;

a position detection circuit for detecting the position of said film-shaped object based on a change in voltage generated between said first and second electrodes in accordance with a change in electrostatic capacitance generated between said first and second electrodes; and an auxiliary electrode located near said second electrode for suppressing an erroneous variation in the electrostatic capacitance generated between said first and second electrodes, said auxiliary electrode being maintained at an electric potential different from, and at a predetermined ratio to the electric potential of the second electrode, said predetermined ratio being selected so as to best suppress any erroneous variation in the electrostatic capacitance generated between said first and second electrodes.

3. The film position detection apparatus according to claim 2 wherein said auxiliary electrode is placed to surround said second electrode.

4. The film position detection apparatus according to claim 2 wherein a voltage is applied to said auxiliary electrode whose value allows an error in the position detected by said position detection circuit to be minimized.

5. A film position detection method for detecting a position of a film-shaped object based on a change in electrostatic capacitance generated between a first electrode located near a place where the film-shaped object is transported and a second electrode comprising a step of:

placing an auxiliary electrode near said second electrode and adjusting a voltage applied to said auxiliary electrode to be different from the voltage applied to said second electrode so that a value of the voltage is selected to best suppress an erroneous variation in the electrostatic capacitance generated between said first and second electrodes and thereby an error in detection of the position of said film-shaped object to be minimized.

6. An image film projection apparatus for projecting light onto an image film transported and projecting an image recorded on the image film comprising:

a first electrode located near a place where said image film is transported;

a second electrode opposed to said first electrode with said image film in between;

a position detecting circuit for detecting the position of said image film based on a change in voltage generated between said first and second electrodes in accordance with a change in electrostatic capacitance generated between said first and second electrodes;

an auxiliary electrode located near said second electrode for suppressing an erroneous variation in the electrostatic capacitance generated between said first and second electrodes, said auxiliary electrode being maintained at an electric potential different from, and at a predetermined ratio to the electric potential of the second electrode, said predetermined ratio being selected so as to best suppress any erroneous variation in the electrostatic capacitance generated between said first and second electrodes; and means for correcting a shift in a projected image obtained through projecting light onto the image film in accordance with a result of detection by said position detection circuit.

* * * * *